Aug. 13, 1963  J. O. KUHN  3,100,420
TOY SLIDE PROJECTOR
Filed April 3, 1961  2 Sheets-Sheet 1
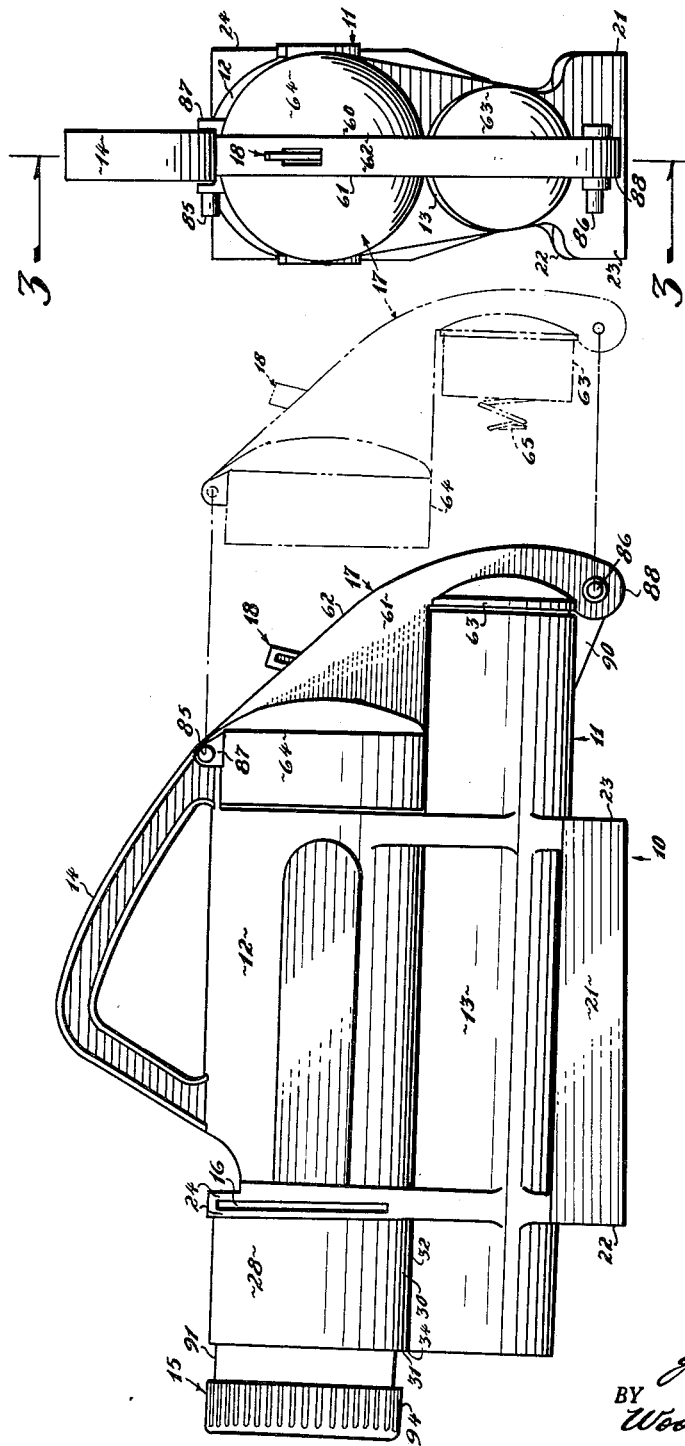
INVENTOR.
James O. Kuhn
BY Wood, Herron & Evans
ATTORNEYS Aug. 13, 1963 J. O. KUHN 3,100,420
TOY SLIDE PROJECTOR Filed April 3, 1961 2 Sheets-Sheet 2

INVENTOR.
James O. Kuhn
BY Wood, Herron & Evans
ATTORNEYS

United States Patent Office 3,100,420
Patented Aug. 13, 1963

3,100,420
TOY SLIDE PROJECTOR
James O. Kuhn, Cincinnati, Ohio, assignor, by mesne assignments, to Kenner Products Company, a corporation of Delaware
Filed Apr. 3, 1961, Ser. No. 100,424
4 Claims. (Cl. 88—26)

The present invention relates to battery operated toys and is particularly directed to a toy slide projector by means of which a child can project a colored slide, or the like, onto a blank wall or screen.

The principal object of the present invention is to provide a simple battery operated slide projector which can be used by young children to project a series of colored cartoons, or other slides, onto a wall or other convenient surface.

The present invention is predicated upon the concept of providing a toy slide projector having three principal components, i.e., a main body member, a lens unit and an end member which can readily be assembled without the use of any tools. Moreover, the end unit carries a switch and electrical connector for joining a bulb in a projection compartment and the batteries in a battery compartment. When this and member is removed, both the bulb and batteries are readily accessible for checking and replacing.

More specifically, the main body or housing member includes two horizontally directed superposed chambers, the lower one constituting a battery receiving chamber and the upper one a projection chamber. The projection chamber houses an electric bulb and reflector which projects light forwardly through a rectangular slot formed in a transverse wall adapted to receive and support an elongated strip of slides. Disposed forwardly of the slide receiving aperture and slidably supported by the housing is the second component, a lens assembly comprising a tubular member which supports two spaced magnifying lenses.

The third major component of the projector is an end member which is effective to close the ends of both the battery chamber and projection chamber. The rear member carries an electrical conductor for establishing a circuit from the batteries mounted in the battery chamber to the bulb mounted in the projection chamber. This end member also carries means for effecting a switching action by means of which the bulb can be selectively energized and deenergized.

One of the principal advantages of the present projector is that it is simple in construction and operation. More particularly, the body member, handle and lens members comprise relatively simple plastic moldings. One connection from the battery chamber of the body molding to the bulb in the projection chamber of this molding is effected by a Z-shaped conductive strip which engages the forward battery terminal, passes upwardly through suitable recesses in the body member, extends along the bottom wall of the projection chamber and extends upwardly along the rear wall of that chamber to form both an electrical terminal and a mechanical support for the forward end of the electric bulb.

The second electrical connection to the bulb is made through a conductive strip carried in the handle member. This strip cooperates with a pivotally mounted switch lever so that when the switch lever is in one position, the conductive strip is spaced from the bulb terminal. When the switch lever is in a second position, the conductive strip is forced into engagement with the bulb to complete an electrical circuit; and the lever is in an overcenter position so that the switch tends to remain closed until the lever is manually shifted. Thus, the present projector requires no special electrical terminals, screws, bolts or other connectors or fasteners. This greatly facilitates the production and assembly of the projector.

Another advantage of the present construction is that when the end member is withdrawn, it automatically uncovers both the battery chamber and bulb so that these electrical elements can be withdrawn and checked to determine the cause of any malfunction.

A still futrher advantage of this construction is that the bulb is withdrawn from the rear of the projection chamber. Thus, not only is the withdrawal of the bulb facilitated, but also it is unnecessary to reach into the main portion of the projection chamber, thereby eliminating the possibility that the reflector would become dirty or broken.

A still further advantage of the present projector is that it is extremely compact. The battery chamber and projection chamber are aligned parallel with one another and are disposed directly on top of one another. Also both the switch and electrical connector are incorporated in the small end member so that the entire projector unit is exceedingly compact. Moreover, the location of the batteries directly beneath the projection chamber is exceedingly advantageous for another reason since it substantially increases the stability of the projector when it is placed upon a table or the like.

These and other objects and advantages of the present invention will be more readily apparent from the following detailed description of the drawings illustrating a preferred embodiment of the invention.

In the drawings:

FIGURE 1 is an elevational view of a toy slide projector constructed in accordance with the principles of the present invention.

FIGURE 2 is an end view of the switch end of the projector.

Figure 3:
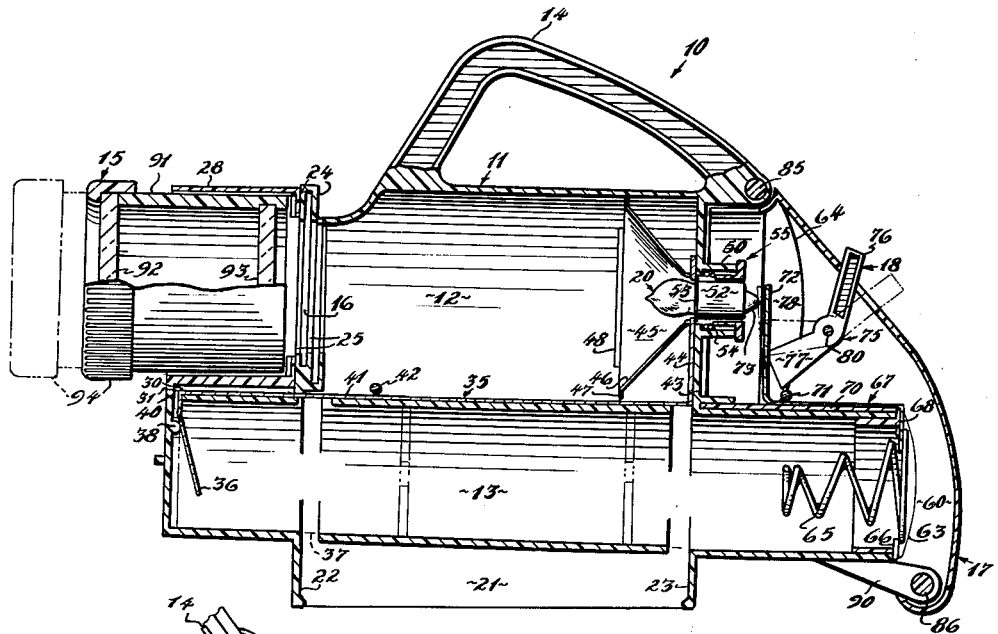
FIGURE 3 is a cross sectional view of the projector taken along line 3—3 of FIGURE 2.
Figures 4, 5:
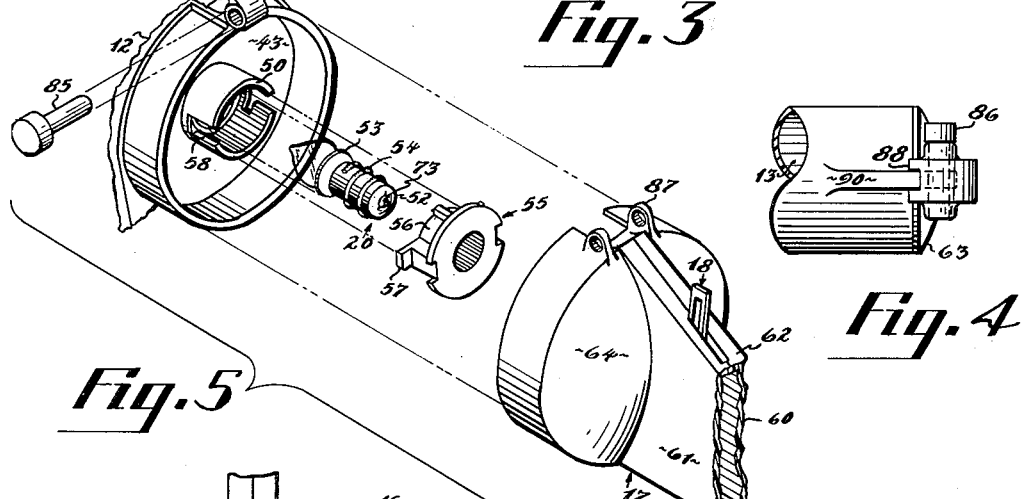
FIGURE 4 is a bottom view showing the manner of attachment of the end member of the unit to the main body member.
FIGURE 5 is an exploded view showing the manner of assembly of the bulb and end unit.

The overall construction of a preferred form of toy slide projector 10 is best shown in FIGURES 1, 2 and 3. As there shown, the slide projector comprises a main body portion 11 configurated to form a projection chamber 12, a battery chamber 13 and a handle 14. A tubular lens member 15 is mounted at the forward end of the projection chamber ahead of a transverse slide receiving slot 16. In addition to these components, the toy slide projector includes an end member 17 which is effective to cover one end of the battery chamber and also one end of the projection chamber. As is explained in detail below, this end member is further effective to provide an electrical connection through a suitable switch 18 from the battery chamber to a light bulb 20 mounted within the projection chamber.

More paricularly, main housing, or body member, 11 is fabricated from two molded rigid plastic halves which are cemented together using any suitable adhesive along the vertical center line of the projector body. The body member is configurated to form an elongated cylindrical battery chamber 13 adapted to hold a plurality of dry cells. Disposed directly above battery chamber 13 is a projection chamber 12. The projection chamber is also tubular and the axis of this chamber is parallel to the axis of the battery chamber.

A base portion 21 is formed on the body member beneath battery chamber 13. It is to be noted that the forward wall 22 of base portion 21 is higher than the rear wall 23. Consequently, when base 21 is placed upon a table or other horizontal surface, the axis of the projection chamber is elevated slightly so that a picture can be projected onto a screen at a convenient height without interference from the table or other support surface.

The projection chamber 12 is generally of tubular configuration and terminates at its forward end in a double transverse wall 24—24. Each wall of this double transverse wall is provided with a rectangular slot 25 of a size slightly greater than the size of a single transparency frame 26. Double walls 24—24 extend generally parallel to one another and are spaced apart a distance only slightly greater than the thickness of the cardboard slide member 27.

A tubular extension member 28 is mounted forwardly of double walls 24—24. This member is secured to wall 24 by means of any suitable adhesive. Tubular extension 28 is provided with two depending longitudinal flanges 30 and a transverse forward flange 31. These depending flanges form a recess portion closed at the front and sides. Flanges 30—30 and 31 abut similar flanges 32, 33 and 34 extending upwardly from the forward portion of battery chamber housing 13. Together, these mating flanges on the battery housing chamber 13 and extension member 28 form a passageway for brass conductor strip 35.

As is best shown in FIGURE 3, brass strip 35 is Z-shaped and includes a terminal engaging portion 36 disposed at the forward end of the battery chamber 13 and adapted to engage the forward terminal of a battery 37 disposed within the chamber. Terminal engaging portion 36 is held in an angulated position by its engagement with a transverse rib 38 formed on the forward wall of the battery chamber 13. The upper end of portion 36 of the conductor strip passes upwardly through a slot 40 formed in the upper wall of battery chamber 13. Conductor strip 35 also includes a longitudinally extending portion 41 which extends rearwardly between the abutting flanges of extension base 28 and the housing and enters the projection chamber through a slot in transverse walls 24. Longitudinal conductor portion 41 passes under a transverse lug 42 formed in the interior of the projection chamber 12 and extends along the bottom wall of that chamber to a rear transverse wall 43 of the chamber. Conductor 35 also includes an upright arm portion 44 disposed in abutment with rear transverse wall 43. This upright portion 44 is provided with a circular opening disposed within a larger opening in transverse wall 43.

A generally conical reflector member 45 extends forwardly from conductor portion 44 and rear wall 43. This reflector member 45, in one preferred form, is made of rigid plastic and is provided with a reflective inner face 46 coated upon the plastic in any suitable manner, such as by vacuum deposition. Reflector mmeber 45 includes a radially extending annular flange 47 which abuts two arcuate inwardly extending flanges 48, one flange being formed on each side housing member. The reflector member is thus accurately positioned within the projection chamber and is firmly clamped against longitudinal movement by its engagement with flanges 48 and the upright portion 44 of conductive strip 35. The reflector also is effective to prevent forward movement of conductor arm 44. Transverse movement of the reflector is prevented by the engagement of its flange 47 with the inner walls of the projection chamber, it being understood that the outside diameter of flange 47 is substantially equal to the inner diameter of the chamber.

A circular sleeve member 50 extends rearwardly from rear wall 43 of the projection chamber. The inner diameter of this sleeve is appreciably larger than the diameter of the opening in conductor strip portion 44. Sleeve 50 is adapted to receive an electric lamp bulb 20. This bulb is provided with a plain cylindrical base 52 having a radial flange 53 disposed adjacent to the glass portion of the bulb. This flange is dimensioned so that its diameter is smaller than the internal diameter of the circular opening in vertical arm 44 of the conductor strip and is smaller than the opening in sleeve 50. Thus, when bulb 20 is inserted in sleeve 50, flange 53 engages the portions of conductor 44 surrounding the circular opening in the conductor arm. The conductor thus not only provides a forward support for the bulb, but also provides an electrical connection to the bulb as well.

The bulb is locked in place in sleeve 50 by means including a spring 54 which surrounds base 52 of the bulb and a locking cap 55. Locking cap 55 includes a tubular portion 56 adapted to be received within sleeve 50. Locking cap 55 also includes two radially extending lugs 57 adapted to be received in bayonet slots 58 provided in sleeve 50.

A second electrical connection to the bulb is made through a conductor carried within end member 17. End member 17 is a molded plastic member comprising two spaced vertical walls 60 and 61 joined by a transverse wall 62. These walls carry a lower tubular cap portion 63 adapted to be telescopically received within and to close the battery chamber 13. End member 17 also includes a tubular upper cap member 64 adapted to telescopically embrace and enclose the rear walls of the projection chamber.

A coiled contact spring 65 is mounted within cap member 63, the spring being disposed between the rear walls of that member and inwardly facing flanges 66. A Z-shaped contact strip 67 formed of brass, or the like, is carried by the end member and includes a lower arm portion 68 which depends downwardly into the interior of cap member 63 through a slot formed in the upper wall of the cap member. Contact strip portion 68 is disposed in engagement with the lowermost turn of spring 65. Thus, the contact member effects an electrical connection to the spring and at the same time helps to hold the spring in assembled relationship with the cap member. Contact strip 67 extends forwardly along the lower wall 70 of end member 17 and is held in position by means of inwardly extending lugs 71 molded integrally with the end member. Contact member 67 further includes an upwardly extending bulb contacting portion 72. This contact arm is adapted to engage the rear terminal 73 of bulb 20 in the manner shown in FIGURE 3.

Contact arm 72 cooperates with an angulated lever member 75 to provide an on-off switch for the projector. More particularly, angulated lever, or switch handle, 75 includes an outwardly extending handle portion 76 and an inwardly extending camming arm 77 disposed at an obtuse angle to handle portion 76. Lever member 75 is pivotally mounted upon pin 80 at its center portion adjacent to the juncture of the handle arm and camming arm.

Lever 75 is configurated and positioned relative to bulb 20 and contact arm 72 so that arm 72 of the contact normally functions as a cantilever spring to urge the switch contact arm to its "off" position shown in solid lines in FIGURE 3. In this position, contact portion 72 is spaced from the end terminal of bulb 20 so that the bulb is deenergized. However, when switch arm 75 is depressed, causing the camming portion of the switch 75 to move counterclockwise in FIGURE 3, contact portion 72 is forced inwardly into engagement with the bulb. Since the principal contact of camming portion 76 of the switch arm with contact portion 72 occurs in the area 78, which is above the pivot 80, there is an over-center condition of the switch lever in its closed position which tends to retain the switch lever in that position until it is manually shifted.

End piece 17 is adapted to be assembled and disassembled from the projector body by shifting the end piece rearwardly as indicated by the dotted lines in FIGURE 1. The end piece is locked in its closed position by means of transverse pins 85 and 86 which pass through openings in ears 87 and 88 formed on end member 17 and pass through suitable bores provided in the rear portion of handle member 14 and in a rearwardly extending flange 90. Pins 85 and 86 are preferably formed of plastic and are frictionally held in place.

In addition to these components, the present projector comprises a lens unit including a tubular member 91 which supports spaced lenses 92 and 93, the lenses being adhesively mounted within the tubular member in any suitable way. The forward end of the tubular member is surrounded by a knurled gripping portion 94 for facilitating inward and outward adjustment of the lens member. This lens sleeve is slidably mounted within forward extension 28.

Figure 6:
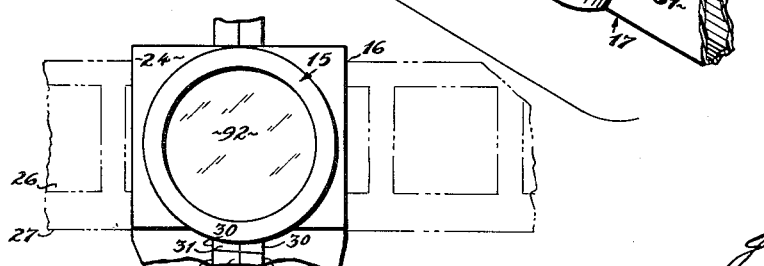
FIGURE 6 is a partial end view of the lens end of the projector showing the manner in which a strip of film is inserted in the projector.

In operation, the present toy projector is adapted to be used with a strip of transparencies best shown in FIGURE 6. This strip of transparencies comprises an elongated cardboard carrier 27 provided with a plurality of spaced rectangular openings. Preferably the cardboard carrier 27 is of double ply. A plurality of transparent pictures are mounted beween the two plies of the carrier strip in registry with the various rectangular openings. These transparent pictures may be actual photographs or may be drawings, such as cartoons, made in a manner well known in the art. When the strip 27 is inserted in opening 16 between transverse walls 24 and a transparency is aligned with the rectangular openings in walls 24, the light from bulb 20 as reflected by reflector 45 passes through the transparency and through lenses 92 and 93 and is thus projected onto a wall, a screen, or the like. Preferably, the various transparencies, or frames, are arranged so that as the strip 27 is advanced across the rectangular opening in walls 24 to illuminate the various frames in sequence, a cartoon story, or the like, is projected on the wall.

In use, the projector can readily be turned "on" or "off" by merely shifting actuating lever 75 from its lower or "on" position to its upper or "off" position, or vice versa. If it should become necessary to replace either bulb 20 or batteries 37, this can readily be done by withdrawing pins 85 and 86 and pulling end member 17 rearwardly. With the end member removed, the batteries are free to be withdrawn from battery chamber 13 and bulb 20 can be replaced by merely removing cap member 55. After the batteries and bulb have been replaced, end member 17 is reassembled with the body portion by telescopically engaging caps 64 and 68 with the end wall portions of battery chamber 13 and projection chamber 12. Thereafter, pins 85 and 86 are reinserted and the unit is again ready for use.

From the foregoing disclosure of the general principles of the present invention and the above description of a preferred embodiment, those skilled in the art will readily comprehend various modifications to which this invention is susceptible. Therefore, I desire to be limited only by the scope of the following claims.

Having described my invention, I claim:

1. A toy projector comprising a molded plastic body member configurated to form a tubular projection chamber including a slide receiving slot and a tubular battery chamber, said projection chamber being superposed upon said battery chamber, a first Z-shaped conductive strip including an arm depending into said battery chamber at one end thereof and another arm extending upwardly into said projection chamber, an electric lamp bulb, means mounting said electric lamp bulb within said projection chamber in contact with the upwardly extending arm of said first Z-shaped conductor, a lens unit, means telescopically mounting said lens unit at the forward end of said projection chamber, an end member engaging the opposite end of said projection chamber from said lens unit and the adjacent end of said battery chamber, a second Z-shaped conductor carried by said end member, said second Z-shaped conductor having a depending arm extending across the opposite end of said battery chamber from said first Z-shaped member, and an upstanding arm disposed for engagement with the end of said bulb.

2. A toy projector comprising a molded plastic body member configurated to form a tubular projection chamber including a slide receiving slot and a tubular battery chamber, said projection chamber being superposed upon said battery chamber, a first Z-shaped conductive strip including an arm depending into said battery chamber at one end thereof and another arm extending upwardly into said projection chamber, an electric lamp bulb, means mounting said electric lamp bulb within said projection chamber in contact with the upwardly extending arm of said first Z-shaped conductor, a lens unit, means telescopically mounting said lens unit at the forward end of said projection chamber, an end member engaging the opposite end of said projection chamber from said lens unit and the adjacent end of said battery chamber, a second Z-shaped conductor carried by said end member, said second Z-shaped conductor having a depending arm extending across the opposite end of said battery chamber from said first Z-shaped member, and an upstanding arm disposed for engagement with the end of said bulb, and a switch lever, means pivotally mounting said switch lever upon said end member, said switch member having a cam arm disposed to force said upstanding arm of said second Z-shaped conductor into engagement with said bulb.

3. A toy projector comprising a molded plastic body member configurated to form a tubular projection chamber including a slide receiving slot and a tubular battery chamber, said projection chamber being superposed upon said battery chamber, a first Z-shaped conductive strip including an arm depending into said battery chamber at one end thereof and another arm extending upwardly into said projection chamber, an electric lamp bulb, means mounting said electric lamp bulb within said projection chamber in contact with the upwardly extending arm of said first Z-shaped conductor, a lens unit, means telescopically mounting said lens unit at the forward end of said projection chamber, an end member engaging the opposite end of said projection chamber from said lens unit and the adjacent end of said battery chamber, a second Z-shaped conductor carried by said end member, said second Z-shaped conductor having a depending arm extending across the opposite end of said battery chamber from said first Z-shaped member, and an upstanding arm disposed for engagement with the end of said bulb, and a switch lever, means pivotally mounting said switch lever upon said end member, said switch member having a cam arm disposed to force said upstanding arm of said second Z-shaped conductor into engagement with said bulb, the switch lever being disposed over-center when said second Z-shaped conductor is in engagement with said bulb.

4. A toy projector comprising a molded plastic body member configurated to form a horizontally disposed tubular projection chamber including a forward end and a rearward end, a slide receiving slot disposed adjacent to the forward end of said projection chamber, a horizontally disposed tubular battery chamber, said projection chamber being superposed upon said battery chamber, the axis of said tubular battery chamber and said projection chamber being parallel, a lens unit, means telescopically mounting said lens unit at the forward end of said projection chamber, an electric lamp bulb having an annular flange therein, means mounting said electric lamp bulb within said projection chamber adjacent to the rearward end thereof, said means comprising a transverse wall disposed within said projection chamber, said wall having a circular opening therein of larger diameter than said bulb flange, a conductive strip disposed adjacent the inner side of said transverse wall, said conductive strip having a circular opening of lesser diameter than said bulb flange, said bulb being inserted through the opening in said transverse wall and said conductive strip with the bulb flange in abutment with said conductive strip, a reflector member disposed forwardly of said conductive strip in abutment with said conductive strip surrounding said bulb, abutment means disposed within said projection chamber forwardly of said reflector and in engagement therewith for holding said reflector member in contact with said strip, said conductive strip also being effective to provide an electrical contact at the end of said battery chamber, and an end member telescopically engaging the end of said projection chamber adjacent said bulb and the adjacent end of said battery chamber, conductor means including a switch carried by said end member for effecting a second electrical connection between a battery and said battery chamber and said bulb.

References Cited in the file of this patent

UNITED STATES PATENTS

| | | |
|---|---|---|
| 2,146,237 | Stephens | Feb. 7, 1939 |
| 2,249,858 | Schwinn | July 22, 1941 |
| 2,694,338 | Moultry et al. | Nov. 16, 1954 |
| 2,764,058 | Ellis | Sept. 25, 1956 |
| 2,844,710 | Zinsser | July 22, 1958 |